US011263344B2

(12) United States Patent
Vágujhelyi et al.

(10) Patent No.: US 11,263,344 B2
(45) Date of Patent: Mar. 1, 2022

(54) DATA MANAGEMENT METHOD AND REGISTRATION METHOD FOR AN ANONYMOUS DATA SHARING SYSTEM, AS WELL AS DATA MANAGER AND ANONYMOUS DATA SHARING SYSTEM

(71) Applicants: Ferenc Vágujhelyi, Budapest (HU); Gábor Magyar, Budapest (HU)

(72) Inventors: Ferenc Vágujhelyi, Budapest (HU); Gábor Magyar, Budapest (HU)

(73) Assignee: Xtendr Zrt., Budapest (HU)

( * ) Notice: Subject to any disclaimer, the term of this patent is extended or adjusted under 35 U.S.C. 154(b) by 366 days.

(21) Appl. No.: 16/306,709

(22) PCT Filed: Feb. 17, 2017

(86) PCT No.: PCT/HU2017/000012
§ 371 (c)(1),
(2) Date: Dec. 3, 2018

(87) PCT Pub. No.: WO2017/141065
PCT Pub. Date: Aug. 24, 2017

(65) Prior Publication Data
US 2019/0213356 A1    Jul. 11, 2019

(30) Foreign Application Priority Data

Feb. 18, 2016 (HU) .................................. P1600099

(51) Int. Cl.
*G06F 21/62* (2013.01)
*H04L 9/08* (2006.01)
(Continued)

(52) U.S. Cl.
CPC ...... *G06F 21/6254* (2013.01); *G06F 21/6263* (2013.01); *G06F 21/6272* (2013.01);
(Continued)

(58) Field of Classification Search
CPC ............. G06F 21/6254; G06F 21/6263; G06F 21/6272; H04L 9/0841; H04L 9/0894;
(Continued)

(56) References Cited

U.S. PATENT DOCUMENTS 4,200,770 A    4/1980 Hellman et al.
4,405,829 A    9/1983 Rivest et al.
(Continued)

FOREIGN PATENT DOCUMENTS

DE    102010037326 A1    3/2012
EP       1939785 A2     7/2008
(Continued)

OTHER PUBLICATIONS

International Searching Authority, Search Report and Written Opinion issued in International Application No. PCT/HU2017/000012 dated May 16, 2017 (10 pages).
(Continued)

*Primary Examiner* — Trong H Nguyen
*Assistant Examiner* — Moeen Khan
(74) *Attorney, Agent, or Firm* — Wood Herron & Evans LLP

(57) ABSTRACT

The invention is a data management method for an anonymous data sharing system, comprising the steps of receiving a data supply from a data source (10), the data supply comprising an anonymous data source identifier, an entity identifier encrypted with the private encryption key of the data source (10), and data associated with the entity. The method further comprises mapping the encrypted entity identifier to a common anonymous entity identifier by applying a classifier key associated with the data source identifier in such a manner that for every entity identifier the following applies: by encrypting said entity identifier with the private encryption key of any data source (10) and by
(Continued)

mapping it using the classifier key associated with the identifier of the data source, the same common anonymous entity identifier is obtained, wherein the data associated with the entity are stored in a database (12) in a manner that said data are assigned to the common anonymous identifier. The invention also relates to a registration method, to a data manager, and to an anonymous data sharing system comprising same.

13 Claims, 4 Drawing Sheets

(51) Int. Cl.
  *H04L 29/06* (2006.01)
  *H04L 9/14* (2006.01)
(52) U.S. Cl.
  CPC .......... *H04L 9/0841* (2013.01); *H04L 9/0894* (2013.01); *H04L 9/14* (2013.01); *H04L 63/0421* (2013.01); *H04L 63/08* (2013.01); *H04L 2209/42* (2013.01)
(58) Field of Classification Search
  CPC ....... H04L 9/14; H04L 63/0421; H04L 63/08; H04L 2209/42
  USPC .......................................................... 726/26
  See application file for complete search history.

(56) References Cited

U.S. PATENT DOCUMENTS

| | | | |
|---|---|---|---|
| 8,892,685 B1* | 11/2014 | Rajkumar | H04L 9/3226 |
| | | | 709/217 |
| 2005/0165623 A1 | 7/2005 | Landi et al. | |
| 2006/0085454 A1 | 4/2006 | Blegen et al. | |
| 2006/0179073 A1 | 8/2006 | Kimura | |
| 2012/0191971 A1* | 7/2012 | Battistello | H04L 9/083 |
| | | | 713/155 |
| 2012/0303616 A1* | 11/2012 | Abuelsaad | G06F 21/6254 |
| | | | 707/736 |
| 2016/0344702 A1* | 11/2016 | Ukena | H04L 63/0421 |
| 2019/0325160 A1* | 10/2019 | Maruyama | G06F 21/602 |

FOREIGN PATENT DOCUMENTS

| | | |
|---|---|---|
| GB | 2469673 A | 10/2010 |
| WO | 0118631 A1 | 3/2001 |
| WO | 2014082648 A1 | 6/2014 |

OTHER PUBLICATIONS

Sweeney, Latanya, "k-Anonymity: A Model for Proteching Privacy," International Journal on Uncertainty, Fuzziness and Knowledge-based Systems, 10 (5), 2002, pp. 557-570 (14 pages).

* cited by examiner

DATA MANAGEMENT METHOD AND REGISTRATION METHOD FOR AN ANONYMOUS DATA SHARING SYSTEM, AS WELL AS DATA MANAGER AND ANONYMOUS DATA SHARING SYSTEM

TECHNICAL FIELD

The invention relates to a data management method and registration method for an anonymous data sharing information system, and to a data manager and an anonymous data sharing system comprising the data manager. The invention allows for mutual analysis of data of data sources, wherein the data of data sources are protected from each other, while preserving the universal uniqueness of data entities.

BACKGROUND ART

A number of data collection and analysis methods are in use nowadays for protecting anonymity. These can be basically divided into two groups. In solutions belonging to the first group, anonymity is only preserved from clients having access to the database. The entities represented by the data are not anonymous to the technical actor(s) responsible for data collection, processing, storage, and for serving the queries (hereinafter: central data management functions). In solutions belonging to the second group, the data sources do not assign a unique identifier to each entity, and therefore entity identification is based on the capability of recognizing the uniqueness of all properties of the entities. If the entities are accurately differentiated by these properties, such recognition is easy, but otherwise it happens in many cases that the data describing different entities are assigned to the same anonymous entity. This results in the network constructed from the interrelations among the entities being an incorrect one. Because—in order that the queries can be served successfully—the data related to the same entity have to be stored in a logically linked manner when they are first entered into the database, with the methods currently in use there is a theoretical obstacle to restricting the central data management actor(s) on recognizing the entities. Today this shortcoming does not hinder significantly the so envisaged data collection and data provision services, because the requirements for data collection systems serving a data analysis purpose are defined in view of such restrictions, thereby renouncing some of the advantages offered.

There are therefore a number of known methods for uploading protected data originating from different data sources to a common database. In these methods, entities are assigned to anonymous identifiers by a service provider performing the role of a central data manager. According to the solutions belonging to the first group of known methods and systems, the entities are provided with a new identifier that in itself (without additional information) cannot be applied for identifying the represented entity (by way of example, a natural or legal person, object, invoice, etc.). Also, usually the bijective characteristics of the relation is sought to be maintained between a particular universal identifier (an identifier of an entity that is utilized by various data sources to identify it, such as a social security number, business registration number, land registry number, invoice number, etc.) and the newly generated one. Entities stored in such a system will therefore become anonymous to an external actor.

Attacks against anonymity based on the uniqueness of attribute sets are usually prevented by applying the k-anonymity method (Latanya Sweeney 2002, http://dataprivacy-lab.org/dataprivacy/projects/kanonymity/kanonymity.pdf).

These methods have the common disadvantage that for a person to decide whether a given entity already has an anonymous identifier in the data inventory it is required for them to know the relations (relational table) between the universal identifiers and the new ones. In prior art systems it was not a requirement that in the direction pointing from the anonymous data to the open data the bijective mapping should be performed exclusively by the original data source. Therefore the process involves such a participant other than the data sources which is not only aware of the identity of the entity, but in the knowledge of the relations it is also able to deanonymize all the data at any time. However, the data sources are usually market competitors and as such they typically cannot settle on the choice of such a participant for fear of significant losses incurred by the potential breaking of anonymity.

According to the second group of the known methods, the data sources send only the attributes to the data manager, excluding the entity identifiers. The data manager—treating the attributes as an entity descriptor—either assigns to it another, previously generated entity with the same or similar attributes, selected from previously stored data, applying a method adapted for measuring similarity, or registers it as a new entity if a previously generated entity is unavailable. Sufficiently similar entities are assigned to a common identifier adapted for protecting anonymity. This method has the shortcoming that it can only be applied with sufficient reliability, if a number of attributes adequate for unique identification are placed into the data inventory. Without this, attribute comparisons required for establishing uniqueness cannot be performed, i.e. data belonging to various entities will be erroneously related to the same entity: the mapping between anonymous and open data is not necessarily bijective any more. If, however, such a data item is received by the data inventory which is particularly characteristic of a given entity, meaning that the universal identifier can be inferred from it, then anyone who has access to the data inventory can link to it all the information stored on the entity, breaking the anonymity of the data inventory. Therefore, possessing the required amount of attributes necessary for the process to work, one may also mount an attack against anonymity. This type of database is therefore well-analysable precisely if it can be easily cracked. When designing a cooperation based on this type of data collection, participants preferring security will create a database that is ill-suited for analysis, while those preferring efficient analysis capabilities will put anonymity at risk.

Currently applied known methods are therefore based on one hand on that the actor performing data collection has to be trusted, because it possesses the unique identifiers of the entities. If anonymity is of crucial importance, then this is unacceptable. On the other hand, as an alternative solution, such data that could be applicable for unique identification are not collected. Instead, statistical methods are applied by the data manager to try and pick from among descriptive data not suited for unique identification such elements which presumably describe the same entity. With such a system, the collected data can only be analysed in a statistical sense, and an analysis concerning individual anonymous entities and their interrelations cannot be safely performed. By way of example, instead of searching for particular exceptions, the statistical rate of occurrence of exceptions may be examined.

Nowadays, data are usually offered for anonymized analysis by companies or state authorities. With companies, the typical candidates are mostly public utility companies having a large number of clients. By way of example, the anonymized databases of various online video rental companies can be invaluable sources of social science research. The video rental companies are of course responsible for not releasing to the public any data related to their customers and their consumption habits. It is in the economic interest of the companies to keep their client lists secret from competitors, while they are obliged by the laws on protecting personal data to keep their clients' preferences secret. If, therefore, the subject of a scientific research project is the cross-population analysis of video rental habits, the researchers would need to retrieve such information from the rental companies (regarded as data sources) which they keep secret even from one another. Of course the researchers do not need to know exactly what films are rented by whom, because for the purposes of their research it is sufficient if information like geographic and social environment, gender, age, schooling, marital status, and net income are assigned to the rented films. Provided that the scope of data is not too wide and the resolution of various characteristics is not too large (e.g. it is sufficient to know that the customer is between 40 and 45 years of age, instead of the date of birth), the client cannot be identified while useful analysis can still be performed.

There are also cases when the topology of networks formed of interrelations among entities (e.g. companies, persons, vehicles, properties, certificates, etc.) represented in the analysed data set is to be analysed. A good example in this respect is the detection of fraud schemes with a characteristic network pattern. In this case the anonymous identifiers of the entities cannot be generated on a statistical basis, but instead a well-defined bijective relation is required between the universally known anonymous identifiers of the entities and their anonymous identifiers stored in the database. In this process, a central data management service provider trusted with the open identifiers of the entities and with the task of generating the anonymous identifiers is typically chosen by the data sources. In this case the data sources have to trust the organization performing the central data management functions, because it can break anonymity at any time as a result of having generated the mapping by itself in the first place. Prior art solutions cannot be applied in such cases when there is no central data manager to be trusted by all data sources, but at the same time they have an extremely strong interest in performing a unified analysis of the networks represented in their databases.

The prior art contains methods and systems wherein data originating from multiple data sources are aggregated in a way that the anonymity of the data sources is retained. In the system disclosed in US 2005/0165623 A1 an identical encryption key is applied for each data source to encrypt the respective data source identifier, thereby enabling the anonymous collection and examination of each patient's health information. A similar system is disclosed in US 2006/0085454 A1, wherein a trusted third party to perform the data conversion and association functions in a protected manner is also included. According to GB 2469673A, multiple data sources are applied for submitting identifiers encrypted with the same key to a central, combined database. A data system allowing for the anonymous aggregation of data is disclosed also in DE 10 2010 037 326 A1. WO 2014/082648 A1 also discloses a solution wherein data are aggregated and transmitted in an anonymized manner. Neither of the above documents discloses such a system that would accomplish the objectives of the present invention declared below and would provide—for data retrieved from the system—anonymity for all participants.

The object of the invention is to provide a solution which eliminates the disadvantages of existing methods to the greatest possible extent. In particular, an object of the invention is to provide a solution by the application of which the descriptive data (attributes) are always related to an encrypted identifier that is in a bijective relationship with the original identifier. Thereby the protection of anonymity and the capability for analysis are provided at the same time.

A solution for maintaining anonymity is offered by the invention for the following basic setup: The setup comprises a number of data owners which all have their own databases. The data stored in the databases by way of example represent relations among entities and the characteristics (attributes) of these relations presumably include also confidential information that has to be protected from others. Such data are for example business documents representing economic relations (invoices, delivery notes, payment data). A network can be formed of the relations among the entities. In order to make this network as complete as possible, the data stored in the various databases have to be combined. It is in the interest of the data owners to perform analyses on the network thus created, but they have to avoid the sharing of the data in a form where original entities are recognizable to others. There are a number of tasks which involve finding a piece of information by analysing the network characteristics of the relations among the entities. Fraud detection is more and more based on analysing the topology of a network around a particular identified entity. For the detection of the risk of fraud, the entities constituting the nodes of the network may be anonymous, but in order to construct the network correctly (in an isomorphic manner), a bijective relationship has to be maintained between the anonymous label and the entity. The invention offers a solution to this problem wherein the anonymity of data from an outside source is preserved both for the entities performing analysis and for the person or organization playing the role of a central data manager (hereinafter: data manager), i.e. the parties do not need to trust each other.

The particular problem to be solved by the invention is therefore the following: information has to be collected from multiple data inventories (in other words, databases) to a common data inventory (database), by way of example on a multitude of relations among identifiable entities, in a way that they cannot be identified by any of the participants even in the case of unauthorized access to the data inventory or by the malicious cooperation of multiple participants, but at the same time the topology of the network created from the relations should not change.

The setup therefore comprises a significant number of data sources that all have their own databases. The databases are adapted for storing relations (e.g. invoices) between entities identifiable with the same type of data (e.g. EU tax identification number). The task to be accomplished is to create a common data inventory with the contribution of a data manager, utilizing all relation data stored in the local databases, so that a) the data sources should transmit the entity identifiers in an encrypted manner, b) the entities and data sources should be anonymous to the data manager participating in the process, c) the data source should preferably receive confirmation on the data provided by it, with the data manager being able to verify the authenticity of the confirmation, d) queries concerning data elements being in a network relation with a given entity identifier should be allowed to be performed on the data stored in the common data inventory so that condition b) holds true for the parameters submitted in the query, e) the anonymous entity identifier included in the result generated according to condition d) should be different for each query-originating entity, but should be included in the result of a given query as a single value, f) the entity identifiers should be stored in the data inventory in such a manner that the open entity identifiers cannot be decrypted by anyone, even if the data fall into adversary hands and/or in the case of malicious cooperation between participants of the process.

The above task and the objective of the invention are accomplished by the data management method according to claim 1, the registration method according to claim 9, the data manager according to claim 11, and the anonymous data sharing system according to claim 15. Preferred embodiments of the invention are defined in the dependent claims.

The task according to the invention was accomplished based on the inferences below. They meet conditions a)-f) which define the features of the inventions defined in the independent claims and also the features of the preferred embodiments defined in the dependent claims.

Inference 1 (assigning encrypted data representing the entity identifier to a class with a common identifier, necessity of a classifier key):

Condition a) ensures the anonymity of the entities. A given entity is identified to all data sources by the same value (by way of example, a social security number). According to point a), this value can be mapped by the data sources utilizing their private encryption mappings to as many different values as the number of the individual data sources. If, in the course of a query according to condition d), the data of a sought entity originating from different data sources are to be found, then the identifiers of the multiple data sources—mapped to different values during encryption—should be mapped to a single value adapted for protecting anonymity (classification), which value should be stored in the data inventory. The function applied for performing this mapping is termed the classifier function.

Inference 2 (the classifier mappings may only be known by the data manager):

The entities and the data sources must remain anonymous to the data manager. The anonymity of the entity is ensured by condition a). According to condition b), the data receiving entity should cater for the anonymity of the data source while at the same time finding out which function it should apply for mapping (classifying) the encrypted data to the common anonymous value. However, according to condition f), this mapping may not be known to the data source, implying that it cannot hand it over to the receiving entity. Should the mapping be known to it, it could directly map the entity identifiers to the values stored in the data inventory. And, if it could access the data inventory, by applying trial-and-error and hopping from one entity identifier to the next, it would be able to break the encryption of the data inventory, which is prohibited by condition f). Therefore, the encrypted data submitted by the data source should be accompanied by an anonymous identifier, based on which the data manager may choose the mapping to be applied for classification.

Inference 3 (necessity of registration and an independent registrar):

The data source should therefore register itself first with an independent service provider, which hands over its anonymous identifier to the data source and to the data manager, its private encryption function only to the data source, and the corresponding classifier function to the data manager only. The service provider does not subsequently store the functions generated by it. The feasibility of the system is not affected adversely, if a data source has multiple registrations and submits or retrieves data irregularly, using its various identifiers and the corresponding encryption keys.

Inference 4 (the data manager passes on the reports generated from the classified data of the data inventory after performing a mapping on them applying a unique report function associated with the entity originating the query):

Due to condition e), the result of the query must not be passed on in the form it is stored in the data inventory, because the data received by the entities originating the query would not be represented by different anonymous entity identifiers. This condition is important for making sure that the entities are not allowed to submit queries in a coordinated fashion in order to break anonymity, and that they cannot analyse a wider range of data jointly by aggregating the results of the coordinated queries. The data manager therefore passes on entity identifiers to the entities originating the query only after mapping them with the report function. These functions realize different mappings, but for the result of a given query always the same mapping is applied. Due to condition b) pertaining to the query parameters, in condition d) the anonymous identifier of the entity originating the query is required as early as performing the classification of the entity identifier parameters. The same identifier helps in selecting the report key. It follows from the discussion above that the entity originating the query should also be a registered data source. The report key is generated by the independent service provider performing the registration and described in Inference 3, and then this service provider passes the key linked with the anonymous identifier of the data source to the data manager.

Inference 5 (necessity of applying a transaction identifier):

In case any entity originating the query may request a report on the entire data inventory without restriction, i.e. it is able to download the complete data inventory in a form mapped by the report function, the risk of breaking anonymity based on the topological features of the network increases. The queries can be governed by rules stating that the network relations can be built starting only from such a data element (network node) included in a query, where the original data source of the given element is the entity (user) originating the given query. If, according to condition c), a transaction identifier containing no additional information is generated by the data manager and it is linked to the data recorded in the data inventory and is also passed on to the data source in an authenticated manner, the data manager can make sure that the given data element comes from the entity originating the query. To accomplish this, it is preferably required that the data source originating the query presents the authentic confirmations that meet condition c) and are associated with the transaction identifiers passed on as parameters.

BRIEF DESCRIPTION OF THE DRAWINGS

Preferred embodiments of the invention are described below by way of example with reference to the following drawings, where FIG. 1 schematically illustrates an exemplary mapping (classification) of the encrypted entity identifiers to common encrypted values, FIG. 2 schematically illustrates an exemplary registration process, FIG. 3 schematically illustrates an exemplary data supply process, FIG. 4 schematically illustrates an exemplary query process, and FIG. 5 schematically illustrates an exemplary data stream.

MODES FOR CARRYING OUT THE INVENTION

Figure 1:
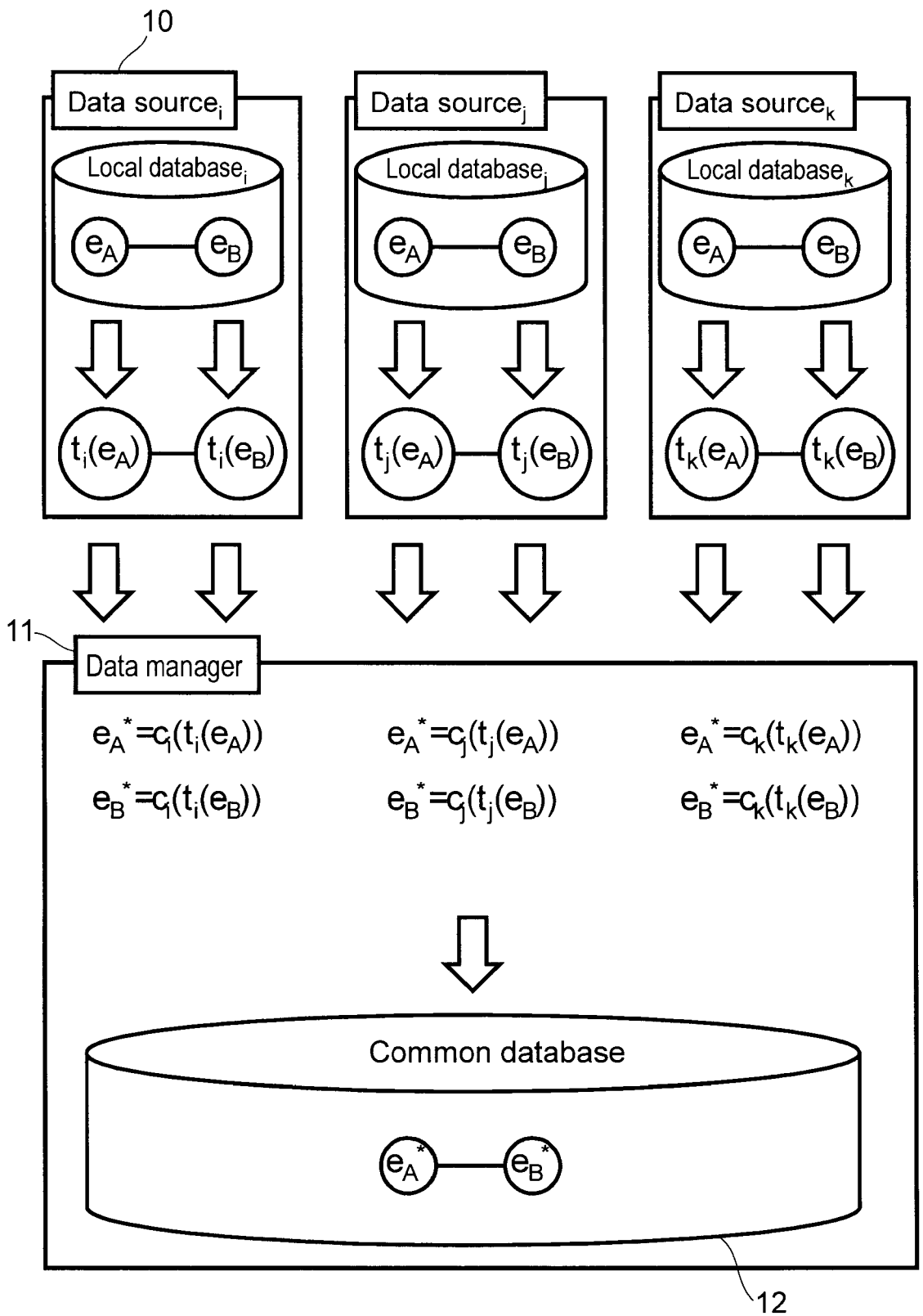

As illustrated in the schematic diagram that can be seen in FIG. 1, in order to prevent identifiability, the data sources 10 have to make unrecognizable (i.e. have to encrypt) the unique identifiers of the stored entities. To do so, each data source 10 has to use a unique, private encryption key. Thereby the identifier of a given entity (e.g. a number) is passed on encrypted in the transmitted information in the form of as many different values as the number of the data sources 10 that are sending information on it. To allow for subsequent data analysis, the data collector, i.e. the data manager 11 has to be able to recognize if entity identifiers, arriving from different data sources, encrypted by different keys, therefore mapped to different values, which ones are representing the same entity, and it has to be able to do that without accessing the original identifier.

Therefore, the data manager 11 has to possess for each data source 10 a key implementing such a function which maps the data encrypted with different keys for each data source 10 to the same value that is different from the original one.

In FIG. 1, $e_A$ and $e_B$ denote the respective entity identifiers of arbitrary entities A and B, with $t_i$ standing for the private encryption key of the i-th data source 10 and $c_i$ denoting the classifier key corresponding to $t_i$ that maps the entity identifier to the common value (e.g. $e_A^*$). The common value is the common anonymous entity identifier that allows for the comprehensive organization and query of the data stored in the common database 12. In the drawing, the lines connecting the entity identifiers and the common anonymous entity identifiers indicate that the connections between the entities remain there after the mapping is completed, i.e. they can be queried later.

By way of example, a partial network structure characteristic of a given entity may be associated with this entity (e.g. a single node with an extreme number of connections). If the characteristics of the interconnections among the entities are also required to be stored in the common database, the scope of such data has to be defined in such a way that it does not enable the breaking of anonymity (by way of example, a company is unambiguously identified by its exclusively used mailing address). In case the fulfilment of analytic objectives still requires such data, then it is expedient to establish a private communications channel (to be described in details later) between the original data source 10 and the entity originating the query, maintaining anonymity at the same time. Thereby the entity originating the query has the possibility to submit a confidential explanation of the data request, to transmit its unencrypted data to the data source 10 or to voluntarily relinquish anonymity, thus allowing direct cooperation outside the system.

The data management method schematically illustrated in FIG. 1 can therefore be applied in an anonymous data sharing system. In the course of the process, data supply is obtained from a data source (10), wherein the data supply comprises an anonymous data source identifier, an entity identifier encrypted with the private encryption key of the data source (10), and data associated with the entity, which are typically open, i.e. unencrypted data that can be accessed in an unencrypted form in the queries.

In the course of the method furthermore, the encrypted entity identifier is mapped to a common anonymous entity identifier applying a classifier key associated with the data source identifier in such a manner that for every entity identifier it holds that by encrypting said identifier with the private encryption key of any data source 10 and by performing a mapping on it using the classifier key corresponding to the identifier of the data source, the same common anonymous entity identifier is obtained. After the mapping is performed, the data corresponding to the entity are stored in the database 12, with the data being assigned to the common anonymous entity identifier.

Figure 2:
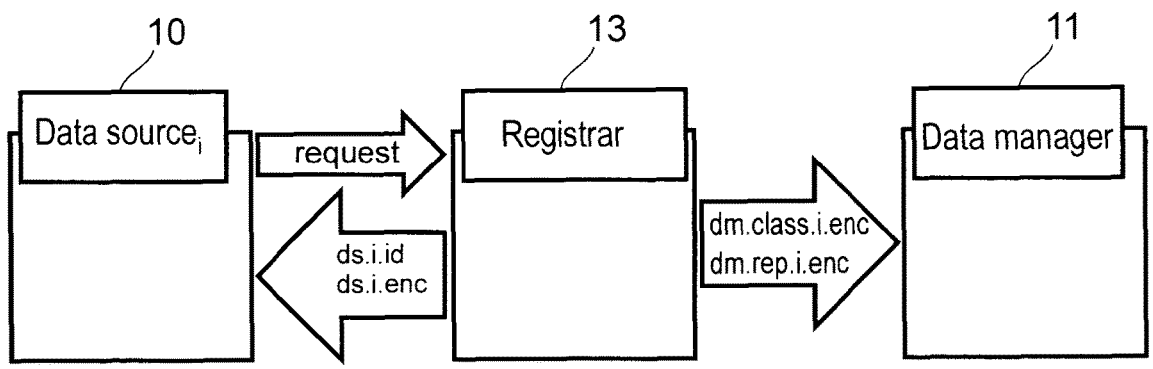

In the course of the registration process illustrated in FIG. 2, when a new data source 10 would like to join the system, a request is submitted to the service provider, i.e. to the registrar 13, which generates the following data on the basis of the request:

the identifier (ds.i.id) of the data source 10, which identifier is passed on (i.e. transferred) by the registrar to the data source 10, the encryption function or key (ds.i.enc) of the data source 10, which key is passed on by the registrar to the data source 10, the classifier function or key (dm.class.i.enc) associated with the data source 10 or its data source identifier (ds.i.id), which the registrar passes on to the data manager 11, and the report function or key (dm.rep.i.enc) associated with the data source 10 or its data source identifier (ds.i.id), which the registrar passes on to the data manager 11.

The cryptographic mappings represented by the keys realize a relationship based on functions between the discrete values, and therefore they can be considered as a mapping table or cipher. In the context of the present invention the term "key" is used also to refer to the mapping (function) realized by it, and these terms are used in an equivalent manner.

To construct the above mentioned encryption functions or keys, one of the applicable cryptographic methods can be the RSA standard (see for example U.S. Pat. No. 4,405,829). In the course of that process, preferably with the exception of the inverse of the encryption key of the data source 10 (ds.i.dec), the inverse keys according to RSA are not generated, the registrar 13 responsible for key generation possesses its own private cryptographic key (reg.enc), the private encryption key (ds.i.enc) of the data source 10 initiating the query, the inverse thereof (ds.i.dec), and the report key (dm.rep.i.enc) are generated by the registrar 13, the classifier key (dm.class.i.enc) is a mapping performed applying the inverse of the encryption key of the data source 10 (ds.i.dec) and the private key (reg.enc) of the registrar 13 in the following order: (dm.class.i.enc(c) =reg.enc(ds.i.dec(c))); thereby, by way of example, it can be ensured that for every entity identifier it holds true that by encrypting said identifier with the private encryption key of any data source 10 and by mapping it using the classifier key associated with the identifier of the data source, the same common anonymous entity identifier is obtained, the classifier key (dm.class.i.enc) is passed on to the data manager 11 after writing it into a secure cryptoprocessor, which prevents anyone from accessing the result of operations performed with the inverse of the encryption key of the data source 10.

The references applied above and in the following discussion are explained below:
- ds.i.id: the anonymous (key) identifier of the i-th data source,
- ds.i.enc: the encryption key of the i-th data source,
- ds.i.dec: the inverse of the encryption key of the i-th data source,
- dm.class.i.enc: the data manager's classifier key associated with the i-th data source,
- dm.rep.i.enc: the data manager's report key associated with the i-th data source,
- reg.enc: the registrar's encryption key,
- id: the entity identifier to be encrypted,
- c=ds.i.enc(id): data passed on to the data manager by the data source,
- o=dm.class.i.enc(c)=reg.enc(ds.i.dec(c)): a classifier mapping performed by a secure cryptoprocessor,
- r2=dm.rep.i.enc(o): the entity identifier that cannot be decoded into open data by the entity originating the query.

Optionally, the report keys may be generated by the data manager 11 instead of the registrar 13. The report key corresponding to the given data source 10 can be replaced with a new one by the data manager 11 after an arbitrary number of reporting instances, but it is imperative to apply a single key in a given report. By using this option in a consistent manner, data stacking from the reports may not be directly applied for breaking the anonymity of data originating from a foreign source.

Figure 3:
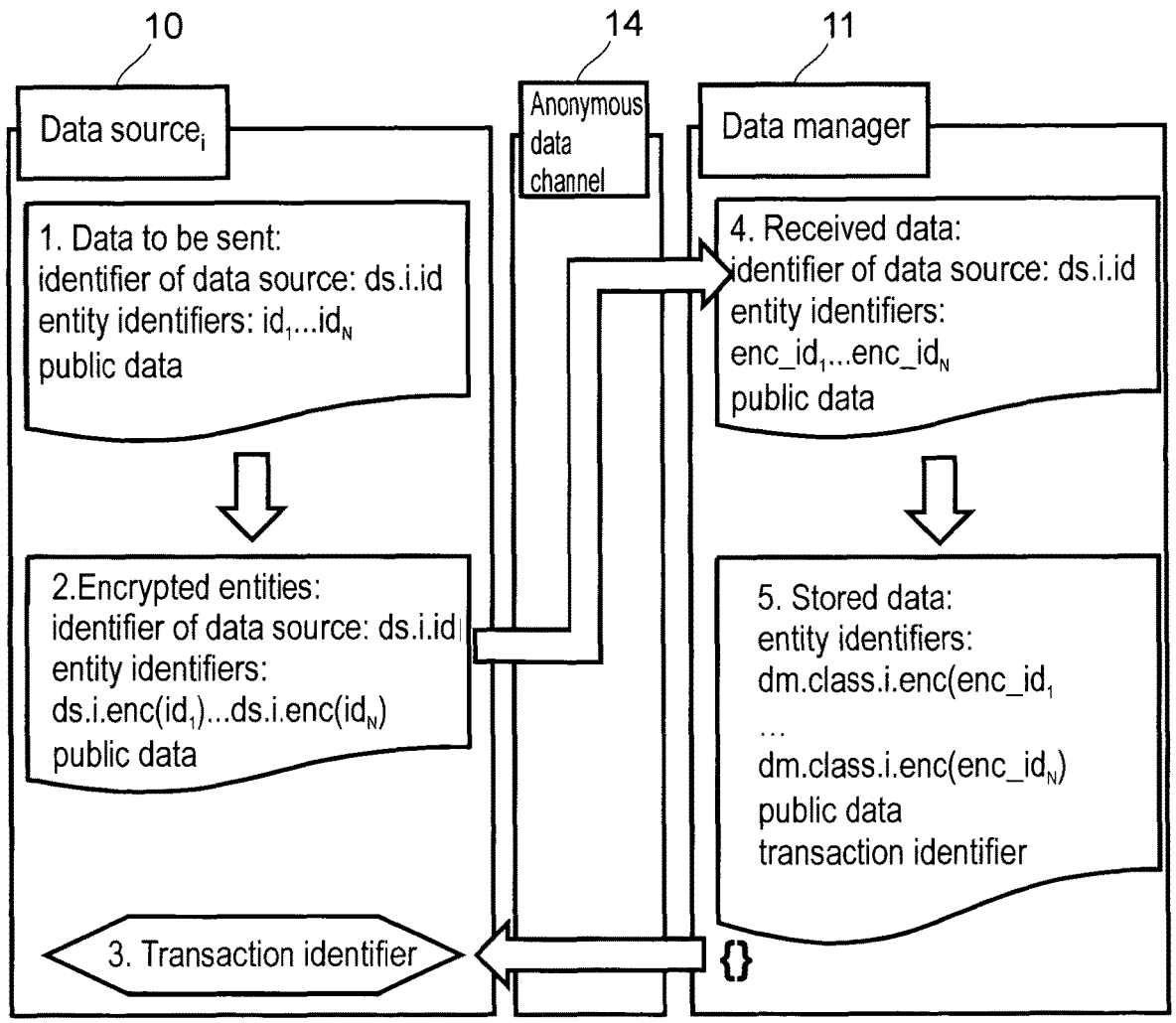

The data supply process that can be seen in FIG. 3 is preferably carried out in a way that the entity identifiers are encrypted by the data source 10 applying its private encryption function (ds.i.enc), and then the so created open data are sent together with its own identifier (ds.i.id) to the data manager 11. The encrypted entity identifiers are mapped by the data manager 11 onto the class identifier, i.e. onto the common anonymous entity identifier applying the classifier function (dm.class.i.enc) associated with the identifier (ds.i.id), with these data being included among the data registered as received and stored in the database 12, data element by data element (record by record), with unique transaction identifiers being preferentially assigned to them. This identifier is preferably sent to the data source, expediently applying an authenticated document. Communication is preferably performed over an anonymous data channel 14, which means that the communicating parties cannot be identified from their intercepted communication. Except for the registration process, all communication is preferably performed over a secure data channel adapted for protecting anonymity. Registration is an exception only if in a concrete implementation of the invention any entity can be a data source without any restrictions.

Figure 4:
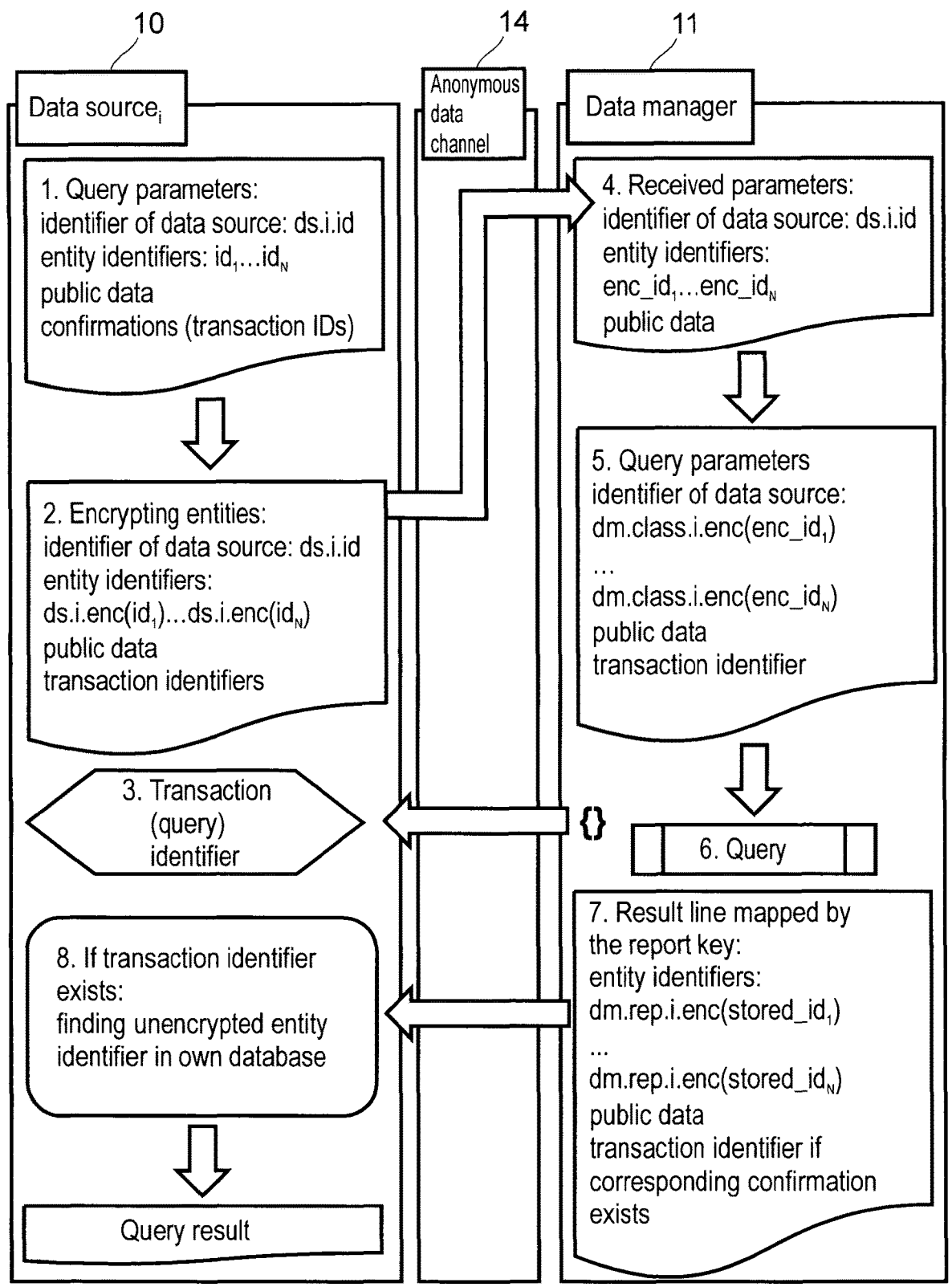

The query process that can be seen in FIG. 4 is preferably the following: In the course of the query, such data elements are retrieved from the database 12 by the data manager 11 for which the logical expression compiled from the query parameters returns a "true" value. If there are entity identifiers among the parameters, they are encrypted by the data source 10 with its private encryption function in a manner described above in relation to information provision, followed by the data manager 11 performing a mapping on them applying the classifier function. Thereby, for running the query, such parameters are already available in a form stored in the database 12. The entity originating the query may also add as a parameter authenticated confirmations received for earlier data retrievals as well as transaction identifiers. This opens up a possibility for only such data elements being included in the result of the query, which are in a network relation with the transactions referenced in the confirmations. The data manager 11 applies the report key for performing a mapping on the entity identifiers in the result, followed by transmitting the data over an anonymous data channel 14 adapted for keeping the anonymity of the entity originating the query.

In the course of the query, therefore, a query concerning one or more entities is received by the data manager 11 from the data source 10, the query comprising an anonymous data source identifier and entity identifiers encrypted with the private encryption key of the data source 10. Applying the classifier key associated with the data source identifier, the encrypted entity identifiers are mapped to the common anonymous entity identifiers, the result of the query is compiled, and then, in the query result, the common anonymous entity identifiers are encrypted with a report key associated with the data source identifier, followed by passing on the result of the query to the data source 10 originating the query.

Optionally, a transaction identifier can be generated for data storage, with the identifier being stored assigned to the data stored in the database 12, and with the transaction identifier being sent to the data source 10 in a—preferably authentically signed—confirmation message. If in this case the query also includes a(n authentic) confirmation or transaction identifier, then it is made possible that only such data are included in the result of the query which are in a relation (preferably having a predetermined or lower number of graph edges) with the transaction identifier. Expediently, the transaction identifiers are also included in the result of the query so that the entity originating the query may recognize its own transactions, and thereby identify the entity identifiers associated with its own data provisions.

Figure 5:
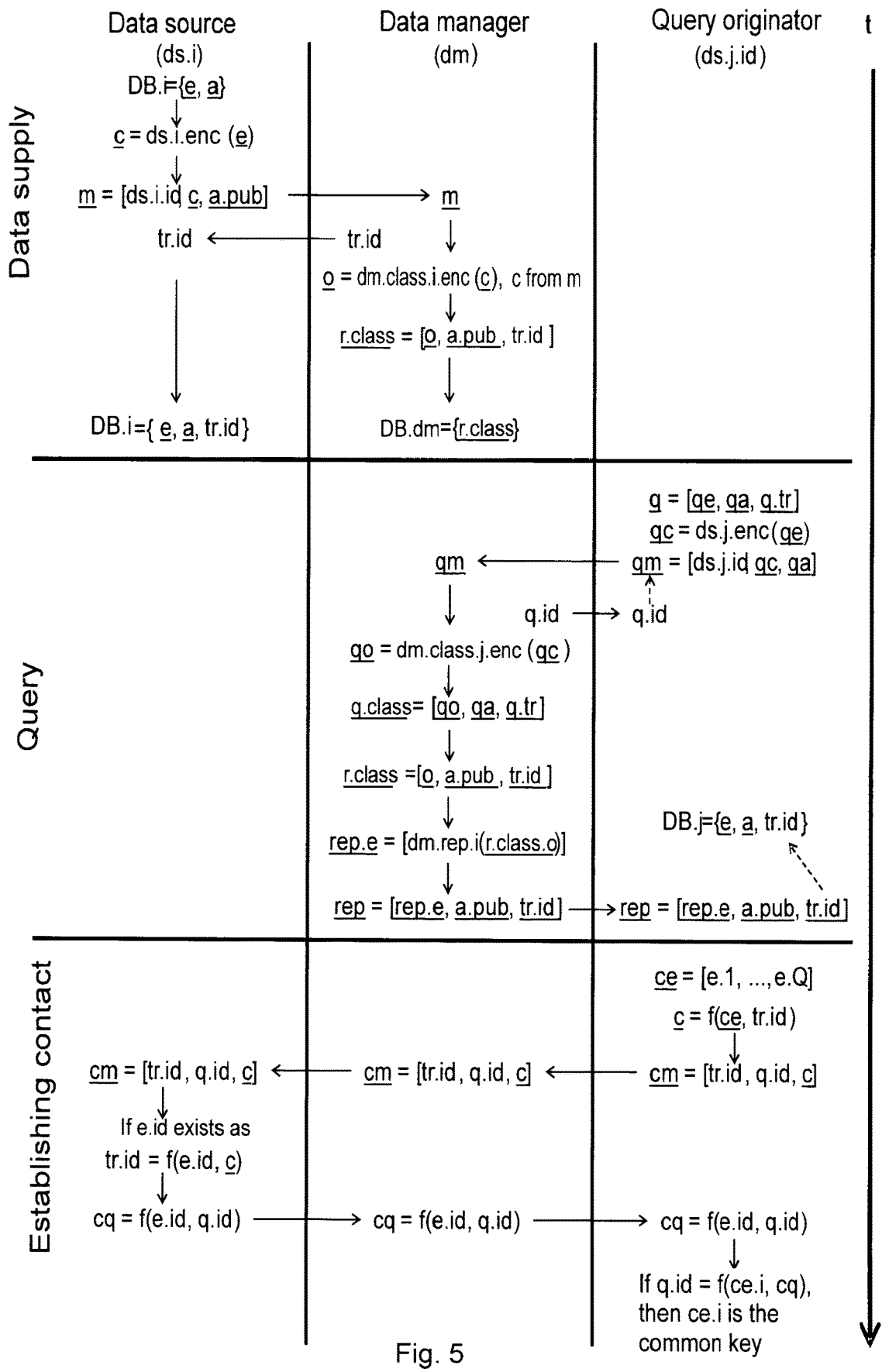

If the entity originating the query would like to access further information, a private data channel adapted for protecting the anonymity of the parties has to be established between the entity originating the query and the data source, by way of example in the manner illustrated in FIG. 5 in the section "Establishing contact", in a way that
- the data manager 11 is applied for making accessible to the data sources 10 a means adapted for data storage, preferably an electronic mailbox that can be marked with two transaction identifiers visible to all data sources 10, with the data storage means (mailbox) expediently marked by the entity that places a message therein,
- the users of the system are all aware of a symmetric encryption algorithm (f),
- utilizing the unencrypted identifier (e.id) of the entity or entities believed to be associated with the transaction selected from the result of the query, the entity originating the query encrypts the transaction identifier (c=f(e.id,tr.id), where this first parameter is the key applied), followed by placing it in a mailbox, which is then marked as a label on the outside with the unencrypted transaction identifier and the unencrypted query identifier,
- in the further course of the process, the anonymous parties can access the mailbox by presenting to the data manager 11 the authentic transaction and query confirmations associated with the label,
- the transaction identifier of the transaction being the subject of the data query is disclosed to the data sources 10 by the data manager 11 so that the data source 10 associated with the transaction can see the data query concerning the transaction originated by it and so that it can have access to the contents of the mailbox (c), next, the original data source of the transaction selects that entity identifier from the requested transaction data which returns as unencrypted data (for which the formula tr.id=f(e.id,c) holds true) the transaction identifier, where that entity identifier is applied as the key of a symmetric encryption algorithm f, and then using the same mailbox and cryptographic key, the data source 10 sends to the entity originating the query the query identifier found on the mailbox, thereby confirming the common key; this encryption method is not strong, because the set of entity identifiers does not typically have the versatility required for cryptography, and thereby this cryptographic mapping is preferably applied by the parties for the two instances of message exchange required for the Diffie-Hellman key exchange algorithm (see for instance U.S. Pat. No. 4,200,770) only, thereby preventing the data manager 11 from mounting a man-in-the-middle attack, and applying this data channel, encrypted communication may be established between the entity originating the query and the data source 10.

In addition to an electronic mailbox, any other suitable data storage means may be applied; for the sake of simplicity, throughout the following description an electronic mailbox will be mentioned, and the embodiment implemented with an electronic mailbox will be explained in details.

The data stream shown in FIG. 5 can be followed through based on the list of references/denotations detailed below. These references are conformant to the ones described above in relation to FIG. 2. Underlined references denote n-tuples (a single element of the direct product of n types). (Let the respective ranges of the types be the sets S1, ..., Sn. Let us generate the Cartesian product of these sets. Let us denote by S the set thereby obtained. If $\underline{v}$ is an element of S, then $\underline{v}$ is called an n-tuple of the above types. By way of example, the direct product of the set of real numbers taken with itself is the two-dimensional real vector space, the elements of which (the vectors) are often represented by underlined small case letters. This representation is kept for the present generalization, i.e. for the n-tuples of types.) One data element in the database (which is also a transaction in the system) represents relation between the entities in that data element, so we also call it a relation later on.

Data provision, central storage:

The anonymous key identifier of the data source: ds.i.id, its own database: DB.i, the central database: DB.dm The universal identifiers of the entities taking part in the relation: $\underline{e}$=[e.1.id, ..., e.N.id]

The attributes of the relation collected in a data inventory: $\underline{a.pub}$=[a.1, ..., a.M]

The attributes of the relation that are not collected in a data inventory: $\underline{a.priv}$=[a.M+1, ..., a.K]

All attributes of the relation: $\underline{a}$=$\underline{a.pub}$ concatenated with $\underline{a.priv}$ The relation at the data source: $\underline{r}$=$\underline{e}$ concatenated with $\underline{a}$ (concatenation here means the expansion of the n-tuple)

Encrypted by data source: $\underline{c}$=ds.i.enc($\underline{e}$) (a mapping performed element by element on an n-tuple argument)

Transmitted by data source: $\underline{m}$=[ds.i.id, $\underline{c}$, $\underline{a.pub}$] (an n-tuple within an n-tuple, i.e. a double-index object)

The data source assigns the transaction identifier (tr.id) received from the data manager to $\underline{r}$ in its own data inventory.

The data manager registers $\underline{m}$ as received, and based on ds.i.id it performs the classification: $\underline{o}$=dm.class.i.enc($\underline{c}$)

The relation stored by the data manager: $\underline{r.class}$=[$\underline{o}$, $\underline{a.pub}$, tr.id]

Query:

The anonymous key identifier of the entity originating the query: ds.j.id

Parameters of the entity originating the query: $\underline{qe}$=[qe.1.id, ..., qe.P.id]

Parameters of the attributes of the entity originating the query: $\underline{qa}$=[qa.1, ..., qa.R], where the parameters may also denote the boundaries of subsets (e.g. time intervals or geographical regions).

Root network transactions of the entity originating the query: $\underline{q.tr}$=[q.tr1, ..., q.tr.S] (which may also be certified, if it is important to prove who is the data source)

Parameters of the query: $\underline{q}$=[$\underline{qe}$, $\underline{qa}$, $\underline{q.tr}$]

Parameters encrypted by the entity originating the query: $\underline{qc}$=ds.j.enc($\underline{qe}$)

Parameters submitted by the entity originating the query: $\underline{qm}$=[ds.j.id, $\underline{qc}$, $\underline{qa}$]

The entity originating the query assigns the transaction identifier (q.id) received from the data manager to $\underline{q}$ in its own data inventory so that it is aware which query it is getting the answer to.

The data manager registers q as received, then performs classification based on ds.j.id: $\underline{qo}$=dm.class.j.enc($\underline{qc}$)

The data manager executes the query with the parameters: $\underline{q.class}$=[$\underline{qo}$, $\underline{qa}$, $\underline{q.tr}$]

The result of the query is: $\underline{r.class}$=[$\underline{o}$, $\underline{a.pub}$, tr.id], where the transaction identifiers of the rows of the result are the n-tuple tr.id.

In the result, the entities mapped with a report key are: $\underline{rep.e}$=[dm.class.i($\underline{r.class.o}$)]

The transmitted result of the query: $\underline{rep}$=[$\underline{rep.e}$, $\underline{a.pub}$, tr.id]

Open entity identifiers of private transactions not stored in a data inventory, from tr.id: $\underline{a.priv}$ Establishing connection with the data source of a foreign transaction involving at least one known entity (f is a cryptographic mapping with private key):

Entities involved in the transactions of tr.id as presumed by the entity originating the query: $\underline{ce}$=[e.1, ..., e.Q]

Optionally, all of these, but at least one of them—applied as a key for f—are mapped one after the other by the entity originating the query to the encrypted values of the transaction identifier: $\underline{c}$=f($\underline{ce}$, tr.id)

The entity originating the query passes on the values $\underline{cm}$=[tr.id, q.id, $\underline{c}$] to the data manager.

The data manager puts them in a mailbox with the addresses tr.id and q.id, which addresses are visible to the data sources.

The data source of the transaction tr.id submits a claim for $\underline{cm}$, producing the confirmation corresponding to tr.id.

If in the relation corresponding to tr.id there exists such an e.id that tr.id=f(e.id, $\underline{c}$), then q.id is encrypted with this key, and q.id is placed in the mailbox: cq=f(e.id, q.id).

Accessing cq from the mailbox, the entity originating the query performs a check: if q.id=f(ce.i, cq), then ce.i is the common key.

Applying that, the entities perform a Diffie-Hellman key exchange to establish the secure connection required for further communication.

The invention is further illustrated by way of the following example.

In an exemplary scenario, owners buy insurances for their (real estate) properties. To do so, they use services provided by insurance companies. A property may have multiple owners. Let us assume that the owners can freely buy insurance. Let us also assume that the insurance companies are interested in not sharing with one another any information on their clients, on the properties insured by them, and on which property is insured by which company. The clients are identified by the aggregate of their natural identifiers (name at birth, mother's name at birth, place and date of birth, gender), and in the case of companies by their tax numbers (hereinafter both: client identifier), while the property is identified with its land registry number, and, if necessary, with the related condominium unit number (hereinafter:

property identifier). It is assumed that all these identifiers are unique. It is in the common interest of the insurance companies that the clients should never be financially interested in the occurrence of a harmful event. Let us assume that this can be ensured, if the amount of compensation paid never exceeds the amount of damages. The insurance companies therefore seek to identify this risk before signing the contract. In order to do so, they would have to know the combined compensation value contracted for the particular property with any insurance company by the (co-) owners. To this end, such a database has to be created wherein parameters such as the client identifiers, the insurance coverage amount, the effective date and, if the contract has been terminated, the date of termination of coverage are included, logically linked to the property identifier. Requests for quotes are also worth uploading as they are also a valuable source of risk management information. However, the insurance companies would not like to disclose the identifiers to one another, but the values and the dates in themselves are not regarded as information to be protected.

The solution according to the invention is described below. First, the data sources, i.e. the insurance companies have to be registered in the system. This has to be accomplished so that the entity performing the registration may never see the data collected by the system, which means that this task should be assigned to an independent service provider which does not store any data. The authorised person of the insurance company applies for registration with the independent service provider. For the sake of simplicity, by way of example this can be done in person.

After the applicant has been identified by the service provider and it has been established that it is eligible for joining the system, an identifier as the i-th data source (ds.i.id) and an encryption key (ds.i.enc) are generated for and submitted to the applicant. Using its own secret key pair (reg.enc), it generates the classifier key (dm.class.i.enc(x) =reg.enc(ds.i.dec(x))) corresponding to the encryption key, as well as the first report key (dm.rep.i.enc), which are submitted together with the identifier to the data manager. The report key (dm.rep.i.enc) is regularly replaced by the data manager itself. The classifier key is transmitted in a secure cryptoprocessor so that the result of the first function (dm.i.dec) constituting the composition generating the classifier key cannot be accessed by the data manager, hence preventing it from obtaining any open data. The identity of the data source remains a secret to the data manager.

The insurance company registered as the i-th data source is now ready for uploading data to the system. Using its database of existing contracts, the insurance company compiles a table wherein it includes the above defined property identifier, the beneficiary's client identifier, the amount of coverage, the two dates, namely the effective date and the date of termination of coverage, and a binary flag of which the "true" value indicates that the data pertain only to a request for quote. If there are more than one beneficiaries in a given contract, each beneficiary is placed in a separate row in the table. Subsequently, the insurance company applies its private encryption key (ds.i.enc) for executing a mapping of the property and client identifiers, replaces the identifiers with the mapped values, and submits the table row by row to the data manager in a manner that preserves its anonymity. For the sake of simplicity, let us use for this purpose a mailbox managed by the data manager, wherein the data manager places in advance a transaction identifier which it has authentically signed, with the data manager also possessing a copy of the transaction identifier. Upon placing the data in the mailbox, the data source fetches therefrom the transaction identifier and keeps it for later use. Thereby an anonymous identifier (ds.i.id) is "found in the mailbox" by the data manager, together with a row of the above described table containing encrypted identifiers representing a property and an insurance beneficiary. The data manager then performs a mapping on these encrypted identifiers applying the classifier function (dm.class.i.enc) associated with the anonymous identifier, makes a new table column where it includes the transaction identifier from the confirmation message and assigns it to the identifiers, followed by placing the rows of the table in the data inventory. Thereby, such a data inventory is constructed by the data manager wherein the data manager has no information on the source of a particular piece of data, it cannot identify either the properties or the beneficiaries, in the case of an anonymity break attack against the data inventory, the anonymity of the properties or the beneficiaries cannot be broken either by any of the data sources (with the exception of the data supplied by the data source itself, because this can be found in its own database using the transaction identifier) or an external party, not even in cooperation with the data manager.

In the further course of using the system, either one of the electronic communications methods providing anonymity, or the above mentioned mailbox is applied. The system is created by the data supplier companies with the intention that they can recognize deviant behaviour on the part of clients about to enter into insurance contracts before making new contracts with them. In order to accomplish this, a query should be initiated. This query has to be compiled from the data submitted by the client requesting the quote. Now let these identifiers be the property identifier and the client identifier. In our example, the insurance company would like to know what insurances are registered in the system for a given property. In addition to that, an important piece of risk assessment information can be if the client has an active insurance for another property. And it can be especially telling, if the same clients turn up in these insurance contracts simultaneously. By performing a mapping on the two parameters of the query utilizing its private encryption key (ds.i.enc), the insurance company passes them on to the data manager over the anonymous communications channel applying the same protocol which is utilized for data supply, i.e. the query will also have a corresponding transaction (i.e. query) identifier preferably written in an authentic confirmation message. Of course, in a query the data manager cannot associate with a given person either the parameters or the entity originating the query. The entity originating the query may also include in the query authenticated transaction identifiers relating to the client and to the property that it received during an earlier data supply session. The data manager applies the classifier key (dm.class.i.enc) to perform a mapping on the property and client identifiers, and then carries out a search on the basis of these values in the data inventory for the client's insurances and other insurances of the given property. This is possible because the classifier was mapped to the same values during the earlier data supply as it is mapped in this case involving the parameters. The search can be set up in a way that those clients and properties are also included in the report, which are nearer than a given number of network nodes to the entities passed on with the parameters or to the entities involved in the confirmation messages. Thereby the result will also include those properties for which such clients have insurance with whom the given client has insurance contracts for other properties. Thus, a network of property insurance contracts related to the client requesting an insurance quote and to the given property will become available for analysis. The data manager generates a table of the data corresponding to the table generated at the time they were first stored, i.e. all the related transaction identifiers will be included at the end of each row. The report function (dm.rep.i.enc) is applied for performing a mapping on the property and client identifiers. The data manager places the result of the query in a mailbox, and writes the query identifier onto the outside of the mailbox. Upon detecting the identifier, the entity originating the query presents to the data manager the authentic confirmation it received at the time the parameters of the query were submitted, and then it takes the result out of the mailbox.

In the result of the mapping the insurance company is presented with a table (property, beneficiary, effective date and date of termination of insurance, amount), where the two entity identifiers (property, client) are included as bijectively mapped anonymous identifiers. The passed-on transaction identifiers are shown beside each row, and thereby for the data originating from itself the insurance company is able to break the anonymity utilizing its own data. To do so, it is also required that the transaction identifiers received for data provided to other entities are stored in a proprietary database. However, the open identifiers of properties and clients covered by other insurers are not visible to the insurance company, just as the data which are located further from the given client or property than a given network distance.

Let us assume that the insurance company has detected such a deviant contract portfolio in the result of the query, which justifies access to further data. It therefore needs to contact the data sources of the transactions it intends to investigate. For a given transaction, this is carried out by taking the steps described above. The entity originating the query chooses a mailbox controlled by the data manager (i.e. the entity requests an empty mailbox). Let us assume that the data sources are all aware of a symmetric-key cryptographic mapping (f) that they will use for this purpose, i.e. all they have to agree on among themselves is a common key. The Diffie-Hellmann key exchange algorithm was designed precisely for this purpose, since it preserves anonymity. Unfortunately, in this case the data manager can easily mount a man-in-the-middle attack, because it is in control of the applied mailbox. Using public keys is out of the question, because the parties do not know each other. Therefore, such information has to be utilized as the key applied for a cryptographic algorithm that both parties possess, but the data manager cannot access. The entity originating the query is in search of information on transactions related to a client and/or property known by it, or on transactions being in a network relation therewith. Thereby, the result of the query has to include a transaction directly related to the client or property searched for. The open data of this transaction are of course known to the data source (since they originate from it), but open entity identifiers are never visible to the data manager. Thus, a search for a transaction assumed to be directly related to a particular entity (by way of example, a client of property having the open identifier e.id) is performed among the results by the entity originating the query. This involves encrypting the transaction identifier applying the open identifier of the entity as a key (c=f(e.id, tr.id), where the first parameter is the key applied). The value obtained (c) is placed in the mailbox, and then the mailbox is visibly marked by the entity originating the query, by using the open transaction identifier and the identifier of its own query. Hence, by presenting their authentic confirmations to the data manager, the parties can prove (while preserving their anonymity) that they are entitled to access the contents of the mailbox. When a data source detects the opening of a mailbox with a confirmation label it possesses, i.e. information related to data originating from it is requested, it presents the data manager with the corresponding authentic confirmation and takes out the contents of the mailbox. It then attempts to decode the message with all the keys involved in the transaction. If the mapping works in any one of the cases (i.e. tr.id=f(e.id, c) holds true), then this particular key (e.id) can be used for communication. The data source confirms the key to the entity originating the query by sending to it the query identifier in an encrypted form. It is unfortunately a serious problem that the number of potentially involved entities is very small relative to the magnitude required by cryptography. Therefore, this key is only applied for the two message exchanges required for the Diffie-Hellmann key exchange, executing a sufficiently rapid message exchange that prevents the data manager from being able to mount a man-in-the-middle attack. Thereafter, the new strong cryptographic key thus obtained is utilized for further communication. The parties may then even agree in a secure manner on contacting each other in a way independent of the method described herein, even directly if so desired. Therefore, if the security of messages is eventually broken at a later stage, this will only reveal the outdated information once required for establishing contact. The entity originating the query may then specify exactly what information it needs, and the data source may ask for a justification of the query, requesting the mutual exchange of all information related to the case. If they decide to do so, the parties may even relinquish their anonymity to be able to enter into direct cooperation outside the system herein described.

The requirements defined in the introduction have thus been fulfilled by the invention: a data inventory that is anonymous and yet capable of analysis has been created. It is possible to establish an encrypted data channel between the entity originating the query and the data source, through the application of which they may extend their cooperation, if they wish to do so, while keeping their anonymity, but they may also voluntarily relinquish their anonymity and contact each other directly, outside the framework provided by the system.

Favourable effects related to the invention—compared to the state of the art—are the following:

According to the invention, an anonymous data inventory is produced in which
- the entities represented by the data remain anonymous to the person or institution performing the central data management functions,
- the data sources and the entities originating the query remain anonymous, and
- the results of the queries are anonymous, but data originating from a given entity can be assigned by the entity to open data applying a transaction identifier,
- there is a bijective relation between the open and anonymous identifiers of the entities, which ensures that a topologically equivalent network is formed by the relations existing between the entities that are anonymous but have unique identifiers, and
- the entity originating the query and the data source may set up an anonymous data channel, by applying a method protected against man-in-the-middle attacks.

Individual entities and the relations between them (in a structure identical to the original) are visible to the entity originating the query in the query results. The scope of the data query may be restricted to such a set of hits wherein each data item is nearer to a data item provided earlier by the entity originating the query than a given relation distance. This is proven by the entity originating the query preferably by presenting an (authentic) confirmation or a transaction identifier. The entity identifiers contained in the query results are unique to each user.

No entity in itself possesses a mapping that, when executed on the contents of the anonymous data inventory, would result in an open entity identifier, in fact, the parties are unable to perform such an operation jointly without the cooperation of the source of a particular data item.

The users of the system are preferably restricted on analysing the entire data inventory, as they can only access partial networks based on data for which they can present an authentic confirmation sent to the data source. The result of the query can be generated in such a manner that it does not contain any nodes or partial graphs with particularly conspicuous characteristics. Thereby the protection of anonymity can be improved also for scale free graphs, while retaining the capability of analysis.

The information technology solution according to the invention, adapted to the anonymous sharing of data, allows for mutual data analysis performed by data sources on data protected from outside access, while preserving the universal uniqueness of data entities. The major features and advantages of the invention can be generally summarized as follows:
- (registration) the data sources perform registration for using the system with one or more independent service providers (registrars), during which process a unique anonymous identifier is generated by the registrar for each data provider, complemented by the following cryptographic keys: the private encryption key of the data source, the associated classifier key and report key, with the anonymous identifier and the private encryption key being passed on to the data source, and the anonymous identifier, the classifier key and the report key being passed on to the data manager, where
- (mappings) the private encryption function of the data sources is a sufficiently strong cryptographic mapping; the compositions of functions applied by the encryption mapping and the corresponding classifier mapping are sufficiently strong cryptographic functions, complemented by that all such compositions of mappings are identically equal for the entire range of values, i.e. all compositions of functions map the open entity identifier to identical encrypted values; the report function is a strong cryptographic mapping, with a subset of its domain being the codomain of the classifier function; no open data are generated in the course of the mappings;
- (data to be sent) the data source's own data comprise relations among entities represented by entity identifiers and data characteristic for the relations, which it sends to the data manager together with its own identifier code after encrypting the entity identifiers applying its own mapping, with
- (confirmation and storage) the data manager performing a mapping on the received data applying the classifier function associated with the identifier code, and storing the result in a data inventory, the result being assigned to a unique transaction identifier the data manager generated, and with the data manager passing on said identifier to the data source after signing it in an authentic manner,
- (query) a query is initiated by a data source with the data manager in a way that the data source submits the following data: its identifier, optionally the authentic confirmations related to the transactions presumably being included in the result, and other parameters involving the scope of the query, including the entity identifier parameters mapped by its private encryption function,
  the data source preferably receives a similar documentary proof about the query, which it received about the data supply;
  the data manager performs a mapping on the encrypted entity identifier parameters applying a classifier function associated with the identifier of the entity originating the query, followed by performing a search in the data inventory so that optionally those data elements are taken into account which are located within a given network distance from any of the data items contained in the transaction identifiers being in the submitted confirmations;
  the result may include the transaction identifiers submitted in the confirmations, or optionally all transaction identifiers, so that the entity originating the query may receive open entity identifiers and further data utilizing its own data or optionally with the voluntary cooperation of another data source;
- (result) the data manager performs a mapping on the entity identifiers, applying a report function associated with the entity originating the query, followed by passing on the mapped identifiers to the entity originating the query,
- (communications) communication between the data sources/entities originating the query and the data manager is performed over a data channel preserving the anonymity of the data source/the entity originating the query.

The invention provides a data collection and retrieval system wherein the anonymity of the stored entities is preserved in a way that the participating entities need not trust one another, and as a result of the queries, the relations between particular entities are maintained. The analysis capabilities of the data sources may be restricted also by making sure that they can only access such data elements that are located not further than a given network distance from the data provided by them, while the constructed data inventory remains anonymous.

Optionally, the solution described above also enables the data source and the entity originating the query to engage in private communication, and at their discretion they can keep or relinquish their anonymity. Thereby they may even share open data with each other.

The information technology devices and components applied in the method according to the invention can be implemented in any customary manner. The devices can be software or hardware devices or any combinations thereof. The hardware devices can be suitable user devices of any kind, and typically comprise one or more processors, data storage means, communications units and peripherals. By way of example, the device may be a server, a desktop, laptop or notebook computer, a cell phone—particularly a smartphone—a tablet computer, etc. A cloud-based implementation is also possible. The steps of the method according to the invention can be taken applying software or hardware devices, or a combination thereof. In the case of a software implementation, the devices implementing the particular steps of the method are typically programme modules. In case it is required to execute the inverse of the encryption function of the data source for calculating the results of the classifier mapping, it is preferably suggested to perform this mapping with a secure cryptoprocessor, in which case this hardware device is also present in the system.

The communications channels may be established for example within an electronic communications network, e.g. within a wired and/or wireless local area network (LAN), WiFi, a global IT network, particularly the Internet, as well as mobile telecommunications networks corresponding to the 3G or 4G standards, a GSM network, etc.

In FIG. 1, the database 12 is shown as an integral part of the data manager 11, but under the database 12 also external data storage means are understood. The database 12 may be implemented as any type of electronic, magnetic, optical or any other data storage means (such as memory, memory card, hard disk, external disk, cloud-based storage, etc.)

The invention claimed is:

1. A method of managing data for an anonymous data sharing system that receives data from a plurality of data sources each associated with a unique private encryption key and containing data associated with an entity, comprising:
  receiving a data supply from a data source of the plurality of data sources, the data supply comprising:
  an anonymous data source identifier,
  an encrypted entity identifier that is associated with the entity, wherein the encrypted entity identifier has been encrypted with the unique private encryption key of the data source, and
  the data associated with the entity;
  mapping the encrypted entity identifier to a common anonymous entity identifier by applying a classifier key to the encrypted entity identifier, the classifier key being associated with the anonymous data source identifier and configured in such a manner that every encrypted entity identifier associated with a same entity obtains a same common anonymous entity identifier;
  storing the data associated with the entity in a database so that the data is assigned to the common anonymous entity identifier;
  generating a transaction identifier;
  assigning the transaction identifier to the data stored in the database;
  sending the transaction identifier to the data source in a confirmation message;
  receiving a query concerning the entity from the data source, the query comprising: the anonymous data source identifier,
  the encrypted entity identifier encrypted with the unique private encryption key of the data source, and the transaction identifier as a first parameter;
  applying the classifier key associated with the anonymous data source identifier to map the encrypted entity identifier to the common anonymous entity identifier, compile a result of the query wherein only data which is connected to the transaction identifier is included in the result of the query, and encrypt the common anonymous entity identifier with a report key associated with the anonymous data source identifier in the result of the query;
  passing on the result of the query to the data source originating the query, wherein once the result of the query is known, a first data source initiates generation of a secure data channel, adapted for protecting anonymity, to a second data source using a cryptographic mapping,
  a data manager provides the first data source and the second data source access to a data storage, users of the anonymous data sharing system are all aware of a symmetric encryption algorithm (f),
  the first data source encrypts an unencrypted transaction identifier (tr.id) to obtain an encrypted transaction identifier c=f(e.id.tr.id) utilizing an unencrypted entity identifier (e.id) of the entity or entities associated with a transaction selected from the result of the query, wherein the first parameter is applied as a key, and places the encrypted transaction identifier in a mailbox,
  the mailbox is marked with a label including the unencrypted transaction identifier and an unencrypted query identifier,
  an anonymous party access the mailbox by presenting an authentic transaction identifier and an authentic query identifier associated with the label to the data manager,
  the data manager discloses the transaction identifier of the transaction which is a subject of a data query originated by the second data source to access contents of the mailbox identified by the encrypted transaction identifier (c),
  an entity identifier returning the unencrypted transaction identifier for which the formula tr.id=f(e.id,c) holds true is found among the entity identifiers associated with the transaction by the second data source,
  the second data source sends the unencrypted query identifier found in the mailbox to the first data source originating the query using the mailbox and a cryptographic key, thereby confirming a common key,
  the cryptographic mapping is applied exclusively for two instances of message exchange required for a Diffie-Hellman key exchange algorithm, thereby preventing the data manager from mounting a man-in-the-middle attack, and encrypted communication is carried out between the first data source and the second data source using the secure data channel.

2. The method of claim 1 wherein the transaction identifier is sent to the data source in the confirmation message, and the confirmation message is signed.

3. The method of claim 1 wherein the transaction identifier is included in the result of the query.

4. The method of claim 1 wherein the data storage is an electronic mailbox identified with two transaction identifiers visible to all data sources.

5. The method of claim 1, further comprising: a registration process that includes performing registration of the data source with one or more independent registrars that generate: the anonymous data source identifier, the unique private encryption key of the data source, the classifier key, and the report key, wherein the anonymous data source identifier and the unique private encryption key are passed on to the data source, and the anonymous data source identifier, the classifier key and the report key are passed on to the data manager.

6. The method of claim 5, wherein the report key is generated by the one or more independent registrars or during data management, and the report key associated with the data source is replaced from time to time.

7. The method of claim 5, wherein the unique private encryption key, the classifier key, and the report key are generated according to a Rivest-Shamir-Adleman (RSA) standard by:
generating an inverse of the unique private encryption key of the data source (ds.i.dec) according to the RSA standard;
and not generating inverse keys other than the inverse of the unique private encryption key of the data source (ds.i.dec) according to the RSA standard, wherein the one or more independent registrars responsible for key generation possesses its own private cryptographic key (reg.enc),
the unique private encryption key (ds.i.enc) of the data source, the inverse of the unique private encryption key (ds.i.dec) of the data source, and the report key (dm.rep.i.enc) are generated by the one or more independent registrars, and
the classifier key (dm.class.i.enc) is a mapping performed by applying the inverse of the unique private encryption key of the data source (ds.i.dec) and the unique private encryption key of the one or more independent registrars (reg.enc) as follows: ((dm.class.i.enc(c)=reg.enc(ds.i.dec(c))).

8. The method of claim 7, wherein the classifier key (dm.class.i.enc) is passed on to the data manager in a form that is written into a secure cryptoprocessor.

9. A data management system that receives data from a plurality of data sources each associated with a unique private encryption key and containing data associated with an entity, comprising:
one or more processors;
and a memory storing program code that, when executed by the one or more processors, causes the data management system to:
receive a data supply from a data source of the plurality of data sources, the data supply comprising: an anonymous data source identifier, an encrypted entity identifier that is associated with the entity, wherein the encrypted entity identifier has been encrypted with the unique private encryption key of the data source, and the data associated with the entity;
map the encrypted entity identifier to a common anonymous entity identifier by applying a classifier key to the encrypted entity identifier, the classifier key being associated with the anonymous data source identifier and configured in such a manner that every encrypted entity identifier associated with a same entity obtains a same common anonymous entity identifier;
store the data associated with the entity in a database so that the data is assigned to the common anonymous entity identifier;
generate a transaction identifier; assign the transaction identifier to the data stored in the database;
send the transaction identifier to the data source in a confirmation message;
receive a query concerning the entity from the data source, the query comprising:
the anonymous data source identifier, the encrypted entity identifier encrypted with the unique private encryption key of the data source, and the transaction identifier as a first parameter;
apply the classifier key associated with the anonymous data source identifier to map the encrypted entity identifier to the common anonymous entity identifier, compile a result of the query wherein only data which is connected to the transaction identifier is included in the result of the query, and encrypt the common anonymous entity identifier with a report key associated with the anonymous data source identifier in the result of the query;
pass on the result of the query to the data source originating the query, wherein
once the result of the query is known, a first data source initiates generation of a secure data channel, adapted for protecting anonymity, to a second data source using a cryptographic mapping,
a data manager provides the first data source and the second data source access to a data storage,
users of an anonymous data sharing system are all aware of a symmetric encryption algorithm (f),
the first data source originating the query encrypts an unencrypted transaction identifier (tr.id) to obtain an encrypted transaction identifier c=f(e.id,tr.id) utilizing an unencrypted entity identifier (e.id) of the entity or entities associated with a transaction selected from the result of the query, wherein the first parameter is applied as a key, and places the encrypted transaction identifier in a mailbox,
the mailbox is marked with a label including the unencrypted transaction identifier and an unencrypted query identifier,
an anonymous party access the mailbox by presenting an authentic transaction identifier and an authentic query identifier associated with the label to the data manager,
the data manager discloses the transaction identifier of the transaction which is a subject of a data query originated by the second data source to access contents of the mailbox identified by the encrypted transaction identifier (c),
an entity identifier returning the unencrypted transaction identifier for which the formula tr.id=f(e.id,c) holds true is found among the entity identifiers associated with the transaction by the second data source,
the second data source sends the query identifier found in the mailbox to the first data source originating the query using the mailbox and a cryptographic key, thereby confirming a common key,
the cryptographic mapping is applied exclusively for two instances of message exchange required for a Diffie-Hellman key exchange algorithm, thereby preventing the data manager from mounting a man-in-the-middle attack, and encrypted communication is carried out between the first data source originating the query and the second data source using the secure data channel.

10. The system of claim 9 wherein the transaction identifier is also included in the result of the query.

11. The system of claim 9, wherein the program code further causes the system to perform a registration process that includes: registering the data source with one or more independent registrars, wherein the one or more independent registrars generate: the anonymous data source identifier, the unique private encryption key of the data source, the classifier key, and the report key, wherein the anonymous data source identifier and the unique private encryption key are passed on to the data source, and the anonymous data source identifier, the classifier key and the report key are passed on to the data manager.

12. The system of claim 11, wherein the unique private encryption key, the classifier key, and the report key are generated according to a Rivest-Shamir-Adleman (RSA) standard by:
generating an inverse of the unique private encryption key of the data source (ds.i.dec) to the RSA standard;
and not generating inverse keys other than the inverse of the unique private encryption key of the data source (ds.i.dec) are not generated according to the RSA standard, wherein the one or more independent registrars responsible for key generation possesses its own private cryptographic key (reg.enc),
the unique private encryption key (ds.i.enc) of the data source, the inverse of the unique private encryption key (ds.i.dec) of the data source, and the report key (dm.rep.i.enc) are generated by the one or more independent registrar,
and the classifier key (dm.class.i.enc) is a mapping performed by applying the inverse of the unique private encryption key of the data source (ds.i.dec) and the unique private encryption key of the registrar (reg.enc) as follows: ((dm.class.i.enc(c)=reg.enc(ds.i.dec(c))).

13. The system of claim 9, wherein the transaction identifier is sent to the data source in the confirmation message, and the confirmation message is signed.

* * * * *